(12) United States Patent
Pandey

(10) Patent No.: US 11,440,515 B2
(45) Date of Patent: Sep. 13, 2022

(54) AUTOMATED TAKEOFF SYSTEM FOR AN AIRCRAFT

(71) Applicant: Rockwell Collins, Inc., Cedar Rapids, IA (US)

(72) Inventor: Krishna Pandey, Jharkhand (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 296 days.

(21) Appl. No.: 16/102,414

(22) Filed: Aug. 13, 2018

(65) Prior Publication Data

US 2019/0106089 A1 Apr. 11, 2019

(30) Foreign Application Priority Data

Oct. 6, 2017 (IN) .............................. 201711035512

(51) Int. Cl.
| | |
|---|---|
| *B60T 8/17* | (2006.01) |
| *B64D 45/00* | (2006.01) |
| *B60T 7/12* | (2006.01) |
| *B64C 25/42* | (2006.01) |
| *B64D 33/04* | (2006.01) |

(Continued)

(52) U.S. Cl.
CPC .............. *B60T 8/1703* (2013.01); *B60T 7/12* (2013.01); *B60T 8/171* (2013.01); *B60T 8/885* (2013.01); *B60T 13/662* (2013.01); *B64C 25/42* (2013.01); *B64D 33/04* (2013.01); *B64D 45/00* (2013.01); *B60T 2270/402* (2013.01); *B60T 2270/406* (2013.01); *B64D 2045/0085* (2013.01)

(58) Field of Classification Search
CPC ...... B60T 8/1703; B60T 13/662; B60T 8/885; B60T 7/12; B60T 8/171; B60T 2270/406; B60T 2270/402; B64D 45/00; B64D 33/04; B64D 2045/0085; B64D 31/06; B64C 25/42; B64C 25/426
USPC .......................................................... 701/15
See application file for complete search history.

(56) References Cited

U.S. PATENT DOCUMENTS

| | | | |
|---|---|---|---|
| 6,043,758 A * | 3/2000 | Snyder, Jr .............. | G01S 13/345 340/963 |
| 9,164,505 B1 * | 10/2015 | Peck ...................... | B64C 25/426 |

(Continued)

FOREIGN PATENT DOCUMENTS

GB 1602477 A 11/1981

OTHER PUBLICATIONS

"Go/No Go Decision Transcript", www.Go_No Go Decision Transcript. html, downloaded Aug. 1, 2017. 3 pages.

(Continued)

*Primary Examiner* — Muhammad Shafi
(74) *Attorney, Agent, or Firm* — Suiter Swantz pc llo

(57) ABSTRACT

An automated take-off system for an aircraft includes a processing circuit an automated braking system of the aircraft, the automated braking system configured to cause the aircraft to stop. The processing circuit is configured to determine whether the speed of the aircraft less than a VR speed and an aircraft failure event has occurred and determine whether to abort the takeoff or continue the takeoff in response to determining that the speed of the aircraft is less than the VR speed and that the aircraft failure event has occurred. The processing circuit is configured to cause the automated braking system to stop the aircraft in response to determining to abort the takeoff.

9 Claims, 9 Drawing Sheets

(51) Int. Cl.
    *B60T 8/171*         (2006.01)
    *B60T 13/66*       (2006.01)
    *B60T 8/88*          (2006.01)

(56) References Cited

U.S. PATENT DOCUMENTS

| | | | |
|---|---|---|---|
| 9,696,724 B1 | 7/2017 | Arons et al. | |
| 10,202,204 B1 * | 2/2019 | Daidzic | B64C 5/02 |
| 2004/0249520 A1 * | 12/2004 | Maine | G01M 15/12 |
| | | | 701/100 |
| 2012/0158211 A1 * | 6/2012 | Chen | G06Q 10/08 |
| | | | 701/1 |
| 2017/0096235 A1 * | 4/2017 | Thomas | B64D 45/00 |
| 2017/0341772 A1 * | 11/2017 | Reis | B64C 13/16 |

OTHER PUBLICATIONS

Flaps2 Approach Journal, "Rejected Takeoff(RTO)—Reviewand Procedures", Feb. 1, 2015. 12 pages.
Lessons Learned, "Lessons Learned from Civil Aviation Accidents" www.lessons Learned.html; Jun. 5, 2017. 2 pages.
Takeoff Safety Training Aid, "Pilot Guide to Takeoff Safety". 45 pages.
Office Action received in Indian Application No. 201711035512 dated Apr. 5, 2022, 5 pages.

\* cited by examiner

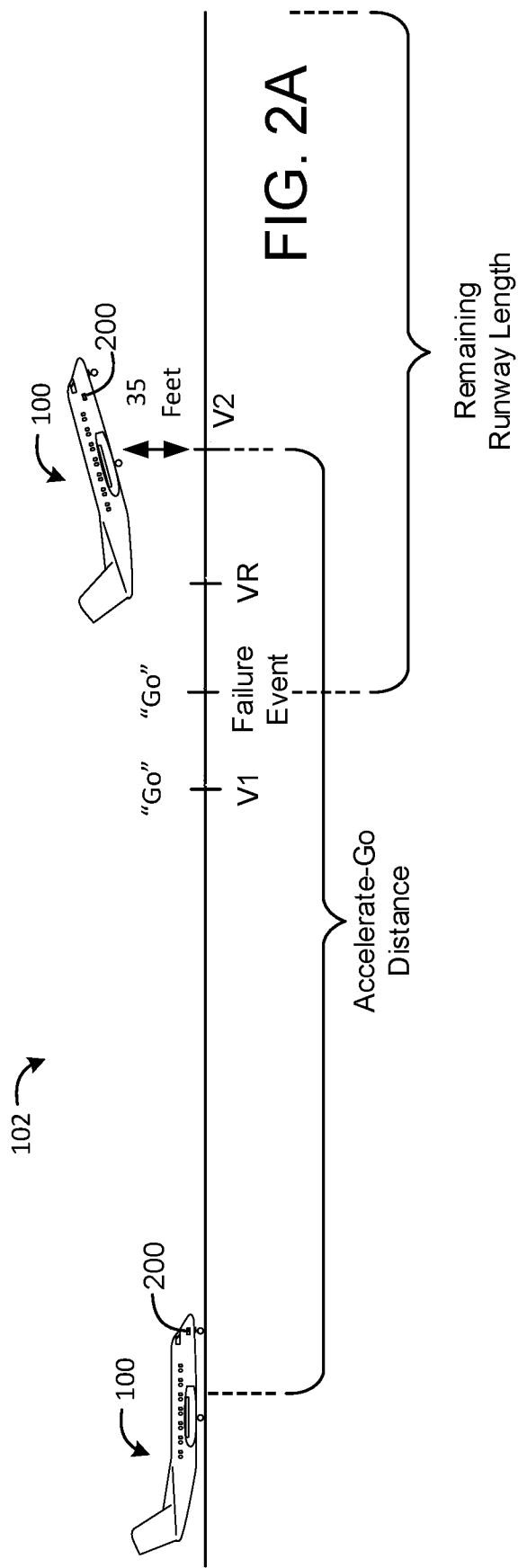
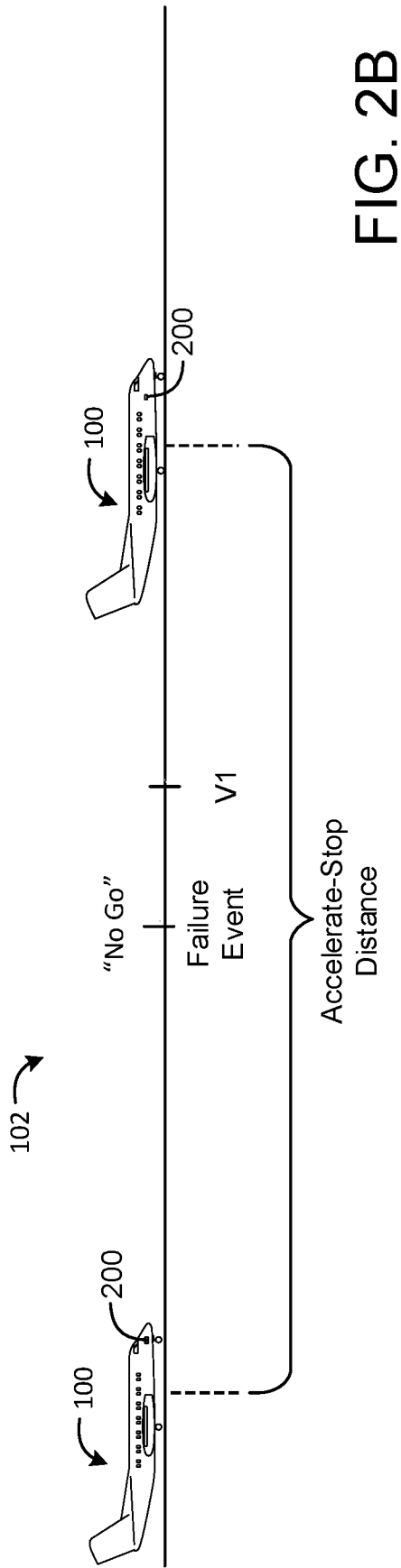

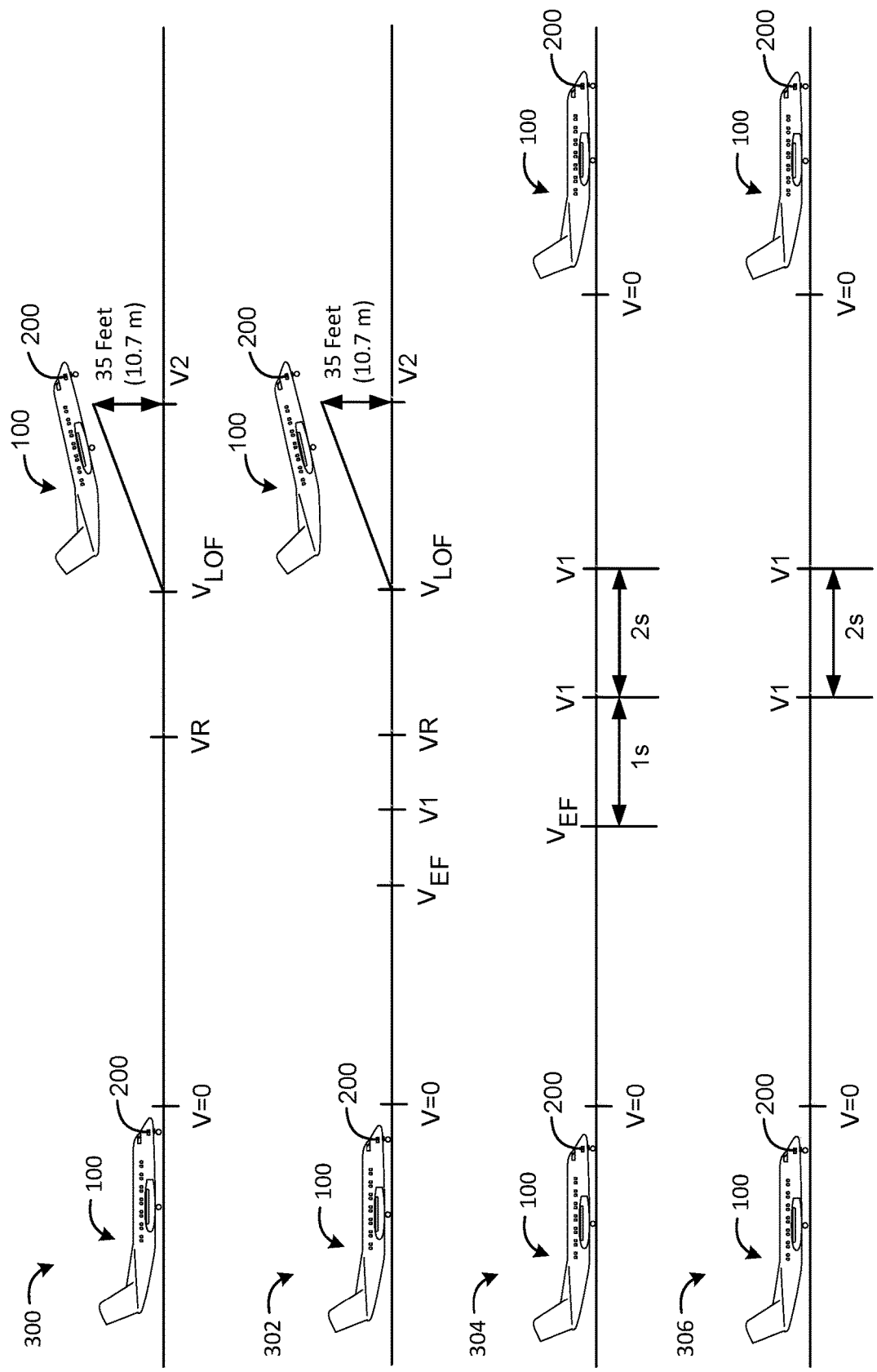

AUTOMATED TAKEOFF SYSTEM FOR AN AIRCRAFT

CROSS-REFERENCE TO RELATED PATENT APPLICATIONS

The present application claims the benefit of and priority to Indian Application Serial No. 201711035512, filed on Oct. 6, 2017, entitled "AUTOMATED TAKE OFF SYSTEM FOR AN AIRCRAFT", which is incorporated herein by reference in its entirety.

BACKGROUND

Embodiments of the inventive concepts disclosed herein relate generally to aircraft takeoffs. More particularly, embodiments of the inventive concepts disclosed herein relate to rejected aircraft takeoffs.

During an aircraft take off, the aircraft can experience various failures. For example, one or more engines may fail, the aircraft may be struck by an object (e.g., a bird), or other possible failures. When the aircraft experiences the failure, a pilot must make a quick decision to continue taking off or aborting the takeoff. If the pilot does not act fast enough, the aircraft may run out of runway length and fail to stop on the runway or fail to take off before reaching the end of the runway. A particular speed of the aircraft, referred to as V1 speed, defines the critical speed that a pilot uses to determine whether to take off or abort the takeoff. Before V1 speed is reached, failures (e.g., a single engine failure) should cause the pilot to abort the takeoff. However, after V1 speed, even if a failure occurs, the pilot should continue to takeoff. When a failure occurs just before, or immediately at, or after V1 speeds, pilots must make quick decisions to avoid disaster.

The decision to continue a takeoff or abort at takeoff may depend on a pilot's personal experience and his quick assessment of a failure event situation. It may take two to five seconds for the pilot to assess a failure event and execute a decision to abort or continue a takeoff. Even if the failure occurs before reaching V1 speed, by the time the pilot makes the decision to abort the takeoff, the aircraft may have already crossed the V1 speed. Any wrong decision at this moment could be catastrophic. Approximately 55% of rejected takeoffs are initiated after crossing V1, which is dangerous.

In most cases, the captain determines, before taking off, the various V speeds (e.g., V1 speed) for the aircraft. If a failure event occurs before the aircraft reaches V1 speed, the captain informs a co-pilot to execute the takeoff abort which can take one to two seconds. The co-pilot and/or captain can bring back the thrust lever, apply brakes, and reverse thrust to bring the aircraft to complete stop. If the decision is made to continue with the takeoff, the pilot can continue taking off and circle back to land safely.

SUMMARY

In one aspect, the inventive concepts disclosed herein are directed to an automated take-off system for an aircraft. The system includes an automated braking system configured to cause the aircraft to stop. The system includes a processing circuit configured to determine whether the speed of the aircraft is less than a VR speed and determine whether an aircraft failure event has occurred. The processing circuit is configured to determine whether to abort the takeoff or continue the takeoff in response to determining that the speed of the aircraft is less than the VR speed and that the aircraft failure event has occurred and cause the automated braking system to stop the aircraft in response to determining to abort the takeoff.

In some embodiments, the processing circuit is configured to determine whether the aircraft includes the automated braking system and causing the braking system to stop the aircraft in response to determining to abort the takeoff and in response to determining that the aircraft includes the automated braking system.

In some embodiments, the processing circuit is configured to determine whether to abort the takeoff or continue the takeoff based on the speed of the aircraft and a remaining runway length.

In some embodiments, the processing circuit is configured to determine whether the speed of the aircraft is less than the V1 speed and determine to abort the takeoff in response to determining that the speed of the aircraft is less than the V1 speed and that the aircraft failure event has occurred.

In some embodiments, the processing circuit is configured to receive input from a pilot and input from one or more avionics systems of the aircraft and determine the VR speed based on the input from the pilot and the input from the one or more avionics system of the aircraft.

In some embodiments, the input from the pilot and the input from the one or more avionics systems includes a runway length, an aircraft weight, and weather conditions.

In some embodiments, the processing circuit is configured to cause the automated braking system to stop the aircraft by causing thrusters of the aircraft to be reversed and aircraft brakes to be applied.

In some embodiments, system includes an audio system configured to play audible instructions to the pilot, the instructions include an audio message indicating that the pilot should abort the takeoff and another audio message indicating that the pilot should continue the takeoff.

In some embodiments, the processing circuit is configured to cause the audio system to play the audio message indicating that the pilot should abort the takeoff in response to abort the takeoff and cause the audio system to play the audio message indicating that the pilot should continue the take the takeoff in response to continue the takeoff.

In some embodiments, the system further includes a lighting system configured to illuminate a first color or a second color indicating to the pilot whether to continue takeoff or abort takeoff. Ins some embodiments, the processing circuit is configured to cause the lighting system to illuminate the first color in response to determining to abort the takeoff and cause the lighting system to illuminate the second color in response to determining to continue the takeoff.

In another aspect, the inventive concepts disclosed herein are directed to a method for An method for automated take-off for an aircraft. The method includes determining whether the speed of the aircraft is less than a VR speed and determining whether an aircraft failure event has occurred. The method further includes determining whether to abort the takeoff or continue the takeoff in response to determining that the speed of the aircraft is less than the VR speed and that the aircraft failure event has occurred and causing an automated braking system to stop the aircraft in response to determining to abort the takeoff.

In some embodiments, the method includes determining whether the aircraft includes the automated braking system and causing the braking system to stop the aircraft in response to determining to abort the takeoff and in response to determining that the aircraft includes the automated braking system.

In some embodiments, the method includes determining whether to abort the takeoff or continue the takeoff is based on the speed of the aircraft and a remaining runway length.

In some embodiments, the method includes determining whether the speed of the aircraft is less than the V1 speed and determining to abort the takeoff in response to determining that the speed of the aircraft is less than the V1 speed and that the aircraft failure event has occurred.

In some embodiments, the method includes receiving input from a pilot and input from one or more avionics systems of the aircraft and determining the VR speed based on the input from the pilot and the input from the one or more avionics system of the aircraft.

In some embodiments, the input from the pilot and the input from the one or more avionics systems includes a runway length, an aircraft weight, and weather conditions.

In some embodiments, causing the automated braking system to stop the aircraft includes causing thrusters of the aircraft to be reversed and aircraft brakes to be applied.

In some embodiments, the method further includes causing an audio system to play the audio message indicating that the pilot should abort the takeoff in response to determining to abort the takeoff and causing the audio system to play the audio message indicating that the pilot should continue the take the takeoff in response to continue the takeoff.

In another aspect, the inventive concepts disclosed herein are directed to an automated take-off system for an aircraft. The system includes an automated braking system configured to cause the aircraft to stop. The system includes a processing circuit configured to receive input from a pilot and input from one or more avionics systems of the aircraft. The processing circuit is configured to determine a VR speed based on the input from the pilot and the input from the one or more avionics system of the aircraft and determine whether the speed of the aircraft is less than the VR speed. The processing circuit is configured to determine whether an aircraft failure event has occurred and determine whether to abort the takeoff or continue the takeoff based on the speed of the aircraft and a remaining runway length in response to determining that the speed of the aircraft is less than the VR speed and that the aircraft failure event has occurred. The processing circuit is configured to cause the automated braking system to stop the aircraft in response to determining to abort the takeoff.

In some embodiments, the processing circuit is configured to cause an audio system to play the audio message indicating that the pilot should abort the takeoff in response to abort the takeoff and cause the audio system to play the audio message indicating that the pilot should continue the take the takeoff in response to continue the takeoff.

In some embodiments, the processing circuit is configured to determine whether to abort the takeoff or continue the takeoff based on the speed of the aircraft and a remaining runway length by determining a stopping distance of the aircraft based on at least the speed of the aircraft, determining the remaining runway length, comparing the stopping distance to the remaining runway length, determining to continue the takeoff in response to determining, based on the comparison, that the stopping distance is greater than the remaining runway length, and determining to abort the takeoff in response to determining, based on the comparison, that the stopping distance is not greater than the remaining runway length.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings:

FIG. 2A is a perspective view schematic drawing of an aircraft with an automated rejection take-off (RTO) system taking off from a runway with V1, VR, and V2 speeds marked in addition to a failure event and the total accelerate-go distance according to exemplary aspects of the inventive concepts disclosed herein;

FIG. 2B is a perspective view schematic drawing of the aircraft with the automated RTO system taking off from a runway with V1, VR, and V2 speeds marked in addition to a failure event and the total accelerate-stop distance according to exemplary aspects of the inventive concepts disclosed herein;

FIG. 3 is a set of perspective view schematic drawings of the aircraft taking off and aborting takeoffs with one engine inoperative (OEI) and all engines operative (AEO) according to exemplary aspects of the inventive concepts disclosed herein;

DETAILED DESCRIPTION

Figure 1A:
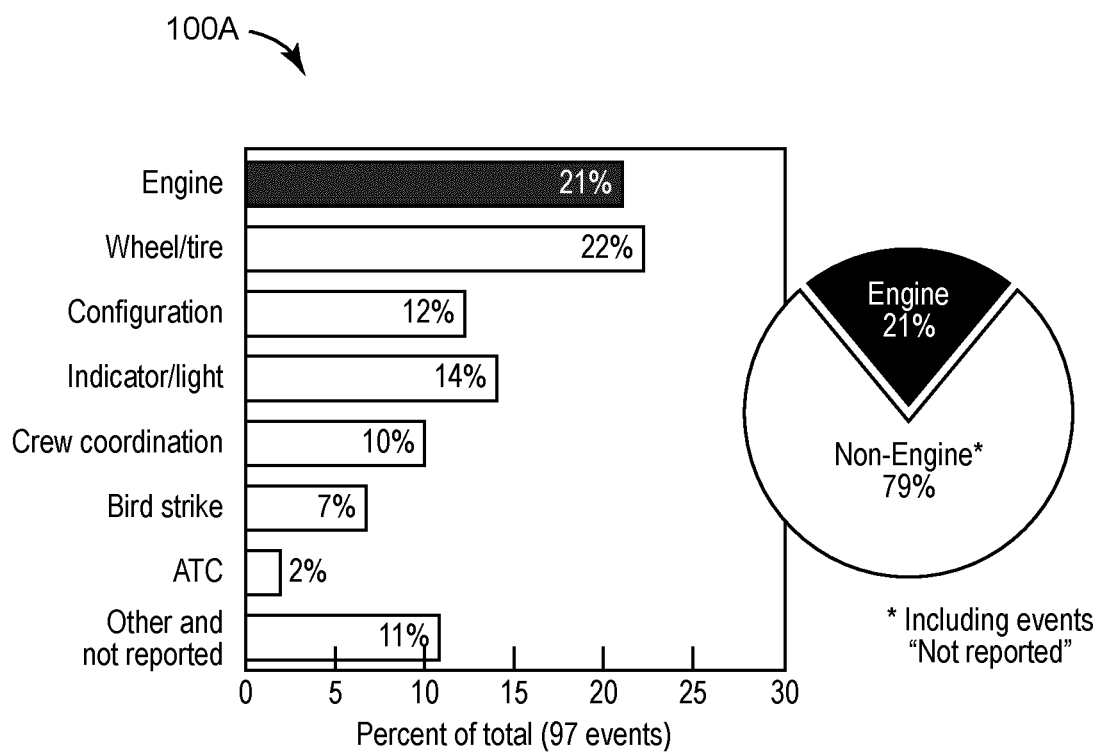
FIG. 1A is a graph illustrative failure events which contribute to aborting a takeoff procedure of an aircraft according to exemplary aspects of the inventive concepts disclosed herein.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the FIGURES, a take-off system is shown for an aircraft that is configured to aid a pilot in determining when to continue or abandon a runway take-off attempt according to the inventive concepts disclosed herein. As an aircraft takes off from a runway, various aircraft faults of malfunctions may occur. For example, one or more of the engines of the aircraft may break and/or stop functioning. For example, a bird may fly into one of the engines. Further, one of the wheels of the aircraft may break. For this reason, quick decision making is required by a pilot to avoid catastrophe when the aircraft experiences a malfunction. The quick decision making, guidance, and automated aircraft stopping can be provided by the automated RTO system described herein.

A pilot can enter various information (e.g., aircraft weight, runway length, etc.) into the automated RTO system prior to taking off. The automated RTO system can determine various V speeds (e.g., V1 speed, VR speed, V2 speed) based on the information provided by the pilot. The automated RTO system can be configured to determine an accelerate to stop distance based on the inputs and a current state of the Aircraft.

Based on the determinations, the automated RTO system can be configured to provide, via an audio system, an annunciation message to the pilot instructing the pilot to continue a takeoff or abort a takeoff. The automated RTO system can make the determination based on the inputs, aircraft current state, and available runway length in 1/10 of a second. The automated RTO system can save 2-4 seconds of crucial time which will help Pilot to focus on the execution of the decision determined by the automated RTO system.

In the case that an automated braking system is present and a decision has been made by the automated RTO to abort a takeoff, the automated RTO system can be configured to cause the automated braking system to set a thrust lever to ideal and apply both brakes with reverse thrust on to bring the aircraft to a stop. If no automated braking system is present, the automated RTO system can be configured to enunciate a "No Go" decision in 1/10 of a second. The pilot can then pull the thrust lever to ideal and apply both brakes with reverse thrust till the aircraft comes to complete Stop. This action may take around 1-2 second. Further, if the pilot fails to correctly perform the procedure for aborting a takeoff, the automated RTO system may warn the pilot of the pilot's mistake.

In approximately 55% of RTO events (Rejected Take Off events), the decision to abort the takeoff is made by a pilot after the aircraft passes V1 speed. At V1 speed, a pilot should have already made the decision whether to take off or not take off. To avoid poor decision making when rejecting a take-off, an automated rejection takeoff system can be used, as described herein according to various exemplary embodiments of the inventive concepts. The automated RTO system can be configured to facilitate safe decision making with aircraft automation to assist a pilot in deciding whether or not to abort or continue a takeoff. The automated RTO system can be configured to provide annunciation messages in case of any safety issue is encountered during takeoff which may lead to any catastrophe. The automated RTO system can be configured to integrate and/or include an automated breaking system, which can be used to abort a takeoff. Further, the automated RTO system can be configured to integrate and/or be a part of any flight management system (FMS), The automated RTO system can be configured to determine whether or not to abort a take-off when failure events occur e.g., one engine inoperative (OEI), a tire failure, wrong configuration of aircraft, and/or any over failure condition. This can help pilot to focus on performing the right action by saving decision making time, which could be anything from 2-5 seconds. Every second lost during takeoff can cause a failure event to become increasingly critical. The automated RTO system can aid the pilot in making the correct decision to continue a takeoff or abort a takeoff based on various attributes in a short amount of time e.g., 1/10 of second, and can use more precise information that available to a pilot.

Regarding RTOs, there may be as many as one RTO per 3,000 takeoffs. Further, there may be one RTO overrun accident per 4,500,000 takeoffs. Out of 97 failure events that occur during takeoff, approximately 21 are due to an engine failure. Deciding whether to continue a takeoff or abort a takeoff may be a stressful decision for a pilot to make due to the necessity to make the decision in a fraction of a second. In many cases, a decision to continue a takeoff or abort a takeoff is be considered "successful" if it does not result in injury to passengers or airplane damage. However, just because a takeoff is "successful" by this definition does not mean the action was the "best" that could have been taken. The use of the automated RTO system can help the pilot make the best decision possible when deciding whether to continue or abort a takeoff.

In some cases, a test pilot is aware of an RTO situation during certification but a line pilot does not know when an RTO situation may occur which can build stress and lead to poor decision making. RTO overrun accidents principally come from approximately 2% of the RTOs that are High speed above 120 knots. This means that most takeoffs can be avoided if a pilot makes the correct decision on time. The automated RTO system can be configured to assist the pilot in making the correct decision on time.

In certification flight tests, the average demonstrated time for the test pilot to apply maximum braking, i.e., bring the thrust leavers to idle and raise the speed breaks, is about one second. The regulations acknowledge that a line pilot does not know when or if a reject will occur so an additional two seconds distance allowance is added for pilots to decide whether to continue a takeoff or abort a takeoff. This additional allowance may be provided to give the line pilot adequate distance to get the airplane into the full stopping configuration, not to give additional time for the Go/No Go decision. The quick decisions made by the automated RTO system described herein can remove the two seconds which the pilot requires to make the continue or abort decision. The accelerate stop testing may be more demanding than in practice, following the engine failure the test pilot applies the wheel brakes and retards the throttles simultaneously. Then the pilot deploys the speed brakes.

Under runway limit conditions, if the reject procedure is initiated at V1 speed, the aircraft can be stopped prior to reaching the end of the runway. However, if the pilot initiates the takeoff abort procedure two seconds after the aircraft reaches V1 speed, the aircraft will go off the end of the runway at approximately 50 to 70 knots. This may be catastrophic.

For this reason, every pilot plans for an RTO situation before takeoff initiates. In many cases, pilots meet to discuss the takeoff plan before beginning takeoff. In many cases, it is optimal for the pilot to not delay in setting the thrust. The sooner the aircraft attains full takeoff thrust, the more runway the aircraft will have left if the aircraft needs to stop. As the aircraft approaches V1 speed, it may be traveling between 200 and 300 feet per second, and accelerating at about 3 to 6 knots per second.

Although a reject beyond V1 speed may be necessary and is fully within the emergency authority of the captain, it should not be attempted unless the ability of the airplane to fly is in serious doubt. It is normally best to continue the take off and deal with the problem in the air. In the case of landing gear or tire issues, the proper recommend may be to take off and circle around in case of limited runway because during the landing most of the runway is available for stopping, so the margin to stop safely is increased.

For a pilot, there may be no time left to decide whether to continue a takeoff or abort a takeoff when the aircraft reaches V1 speed. At V1 speed, the pilot must be ready to initiate the stop. Once the decision to stop the aircraft is made, every device, brakes, speed brakes, and reverse thrust must be used to the maximum until the pilot is convinced that the airplane will stop on the remaining runway. Making the "Go" or "No Go" decision starts long before V1. Early detection, good crew coordination, and quick reaction may be key to a successful take off or stop. Many pilots may incorrectly think that at V1 speed, there was still time to make the "Go" or "No Go" decision. Two important variables of pre-flight planning may be to establish, for an RTO to be executed safely, the V speeds and runway length.

A "No Go" decision after passing V1 speed may not leave sufficient runway remaining to stop if the takeoff weight is equal to the field length limit weight. For this reason, a flight crew should be able to accelerate the aircraft, have an engine failure, abort the takeoff, and stop the aircraft on the remaining runway or, accelerate the aircraft, have an engine failure, and be able to continue the takeoff utilizing one engine.

As the speed of the aircraft approaches V1, the successful completion of an RTO becomes increasingly more difficult. Though each "Go" or "No Go" situation has its own complex series of events, a summary of one accident report and see the consequences of the decision to reject after V1. In this accident report, the airplane taxied out with the first officer set to do the takeoff. The first officer confirmed that in case of a rejected takeoff the captain would make the decision to reject and the first officer would execute the takeoff rejection. Two and one half seconds after the aircraft passed V1 speed, 156 knots, the aircraft speed, was called out. Then, engine number four fire warning came on in the cockpit. The first officer stated that he noticed a movement of the captain's hand towards the throttles and proceeded with rejecting the takeoff. However, the captain did not make any call out to reject. The maximum speed attained during the reject was 172 knots. The airplane couldn't be stopped on the paved surface and finally came to rest about 1,500 feet beyond the end of the runway. The aircraft sustained substantial damage. One passenger received minor injury during the process of evacuation. There was no engine fire.

Referring now to FIG. 1A, chart 100A illustrates the various events that contribute to a rejected takeoff. As can be seen, engine failure contributes to approximately 21% of rejected takeoffs, tire failures contribute to approximately 22% of rejected takeoffs. Improper configuration of the aircraft contributes to approximately 12% of rejected takeoffs. Faulty indicators and lights contribute to approximately 14% of rejected takes. Crew coordination, bird strikes, air traffic control also contribute to aborted takeoffs in varying amounts.

Various factors contribute to determining whether to abort a takeoff. The automated RTO system described herein can use factors such as runway length, wind direction and wind speed, the various V speeds (e.g., V1 speed, VR speed, V2 speed, etc.), brake conditions (e.g., worn down brake pads), thrust settings, flaps settings, engine bleed settings, all engine go distances, engine out accelerate go distance, accelerate stop distance, obstacle clearance limit, maximum brake energy, tire speed limits, runway conditions, and human performance factors.

If tires of the aircraft fail at high speed, it is possible that pieces of the tire can be thrown against the aircraft body or the flaps, causing damage to the aircraft. Braking after a tire failure may reduce braking effectiveness and the ability for the aircraft to stop. Unless a tire failure in the high speed regime has produced damage that puts the ability of the airplane to fly in serious doubt, it may be optimal to continue the takeoff. For this reason, the automated RTO system described herein may determine whether the aircraft 100 has taken significant damage during a takeoff after a tire failure to determine whether to continue the takeoff (i.e., the damage does not prevent the aircraft from flying) or abort the takeoff (i.e., the damage prevents the aircraft from flying).

The automated RTO system can, at any point of time during takeoff, make the pilot aware of the best solution to continue a takeoff or abort a takeoff within fractions of seconds. The pilot may be able to select an option on a control interface to enable the automated RTO system before beginning a takeoff. Based on the various factors impacting the RTO, the automated RTO system can be configured to determine whether to abort or continue a takeoff. The automated RTO system can be configured to provide a pilot accurate feedback in a fraction of second to avoid most of runway overrun accidents.

If an autopilot system is engaged, the automated RTO system can be configured to cause the autopilot system to stop the aircraft via automated braking. The automated RTO system can be configured to help a pilot (or autopilot) make the best and safest decision during RTO situation, hence the automated RTO system can reduce pilot error. This may allow a pilot to relax and focus on the takeoff procedure rather than worry about aborting a takeoff. Further, the automated RTO system can ensure safe takeoff rejection execution and minimize pilot performance error by saving good amount of time for pilot to react and take action. The automated RTO system can help avoid any catastrophe or aircraft damage related to RTO.

Figure 1B:
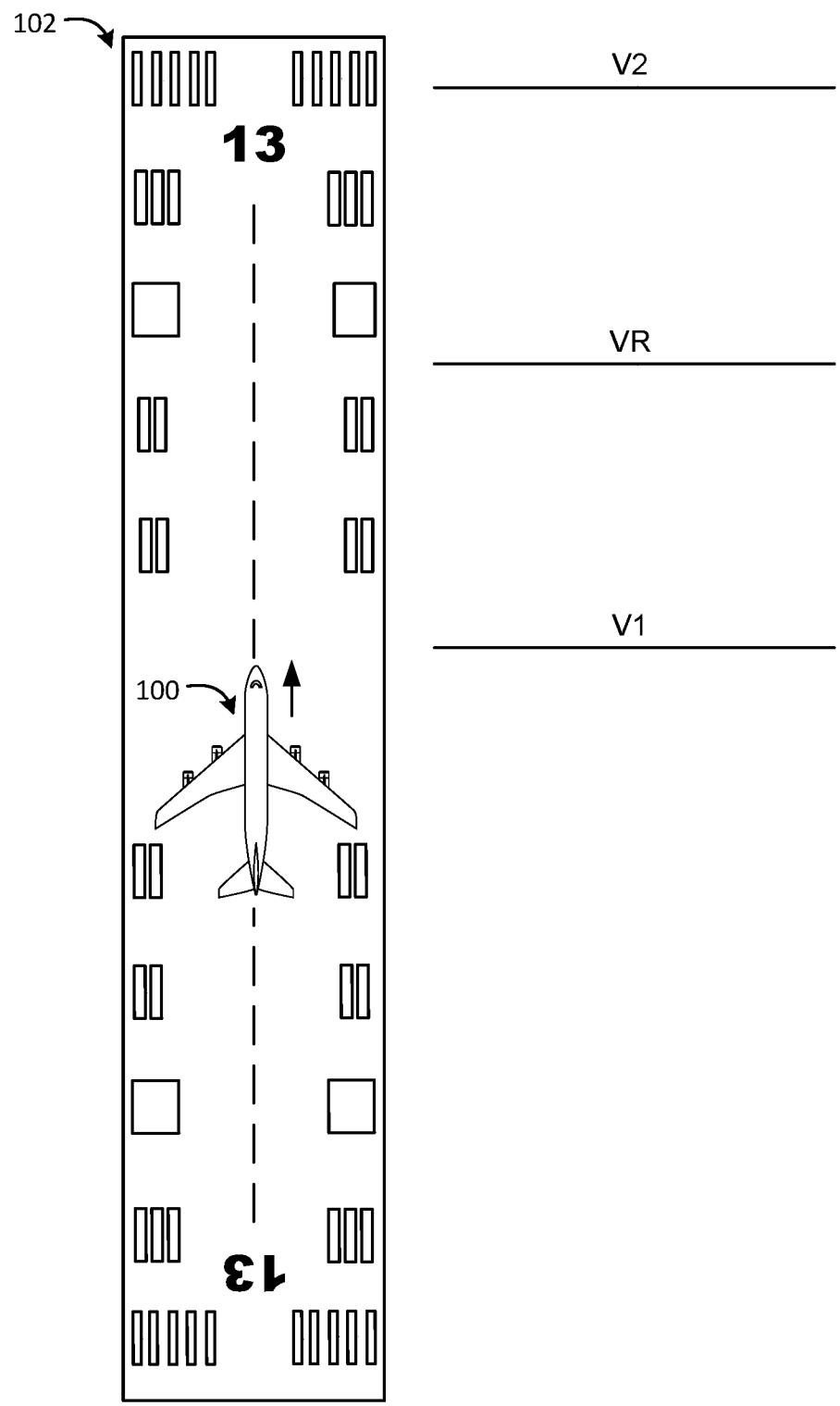
FIG. 1B is a perspective view schematic drawing of an aircraft taking off from a runway with V1, VR, and V2 speeds marked according to exemplary aspects of the inventive concepts disclosed herein.

Referring now to FIG. 1B, an aircraft 100 is shown taking off from a runway 102, according to an exemplary embodiment of the inventive concepts. The aircraft 100 of FIG. 1 is shown to be an airliner. However, the aircraft 100 may be any kind of commercial aircraft, military aircraft, helicopter, unmanned aerial vehicle (UAV), spacecraft, and/or any other kind of vehicle, manned or unmanned. As the aircraft 100 accelerates down the runway 102, the speed of the aircraft reaches various defined amounts which may be based on aircraft weight, runway length, flap settings, weather conditions, etc. These levels may include V1 speed, VR speed, and V2 speed. Indications of V1 speed, VR speed, and V2 speed are shown in FIG. 1B.

The V1 speed for the aircraft 100 may be the speed at which the pilot of the aircraft 100 is required to make a takeoff decision, i.e., continue a takeoff or abandon a takeoff attempt. Once the aircraft 100 passes V1 speed, if the pilot of the aircraft 100 attempts to abandon the take-off attempt, the aircraft 100 may overrun the runway 102 causing a catastrophe, endangering the passengers of the aircraft 100 and damaging the aircraft 100. Once the aircraft 100 reaches VR speed, the pilot of the aircraft 100 may control the aircraft 100 to raise the nose of the aircraft and begin lifting off the runway 102 (i.e., begin rotation of the aircraft 100). Once the aircraft reaches the V2 speed, the aircraft 100 is 35 feet above the runway 102 as has successfully taken off.

Referring now to FIG. 2A, an automated RTO system 200 of the aircraft 100 is shown guiding a pilot of the aircraft 100 through taking off after a failure event has occurred, according to an exemplary embodiment of the inventive concepts. As can be seen in FIG. 2A, the aircraft 100 completes a successful takeoff achieving an altitude of 35 feet above the runway 102 before reaching the end of the runway, i.e., the accelerate-go distance of the aircraft 100 does not exceed the length of the runway 102.

In FIG. 2A, the aircraft 100 passes V1 speed. The automated RTO system 200 can enunciate, at V1 speed, via an audio system a "Go" instruction to the pilot or a "V1 speed reached" instruction. However, after passing V1 speed but before reaching VR speed, a failure event occurs. The takeoff event could be an engine failure, a tire blowout, an object striking the aircraft 100 or any other event which may endanger the takeoff of the aircraft 100. The automated RTO system 200 can be configured to determine whether or not to continue or abort the takeoff. The automated RTO system 200 can be configured to determine a remaining runway length. Based on the remaining runway length, the current speed of the aircraft 100, and/or the type of failure event that has occurred, the automated RTO system 200 can be configured to determine whether to continue or abort the takeoff. In FIG. 2A, the automated RTO system 200 determines to continue the takeoff and a second "Go" or "Continue takeoff" message is enunciated by the audio system.

Referring now to FIG. 2B, the automated RTO system 200 is shown guiding the pilot of the aircraft 100 through aborting a takeoff of the aircraft 100 according to an exemplary embodiment of the inventive concepts. As can be seen in FIG. 2B, the accelerate-stop distance is shown. The accelerate-stop distance may be the total distance that the aircraft 100 will travel if a failure event occurs before reaching V1 speed and the pilot aborts the takeoff before reaching V1 speed.

In FIG. 2B, the aircraft 100 experiences a failure event before reaching V1 and VR speeds (i.e., VR speed is always greater than or equal to V1 speed). In response to a failure event occurring before reaching VR speed, the automated RTO system 200 can determine whether V1 speed has been reached yet. In response to V1 speed not being reached, the automated RTO system 200 can be configured to enunciate a "No Go," "Abort Takeoff," or any other instructions informing the pilot to cause the aircraft 100 to stop. In some embodiments, the aircraft 100 can include an automated braking system. The automated braking system can be configured to apply brakes, reverse thrusters, apply spoilers, etc. In response to determining to abort a takeoff, the automated RTO system 200 can be configured to cause the automated braking system to bring the aircraft 100 to a stop.

Referring now to FIG. 3, various takeoffs of the aircraft 100 are shown for OEI situations and AEO situations, according to an exemplary embodiment. Various V speeds are shown in FIG. 3. The V speeds are V1, the decision speed, Vr, the rotation speed, $V_{EF}$, the engine failure speed (i.e., the speed at which the primary engine is assumed to fail), V2, the takeoff safety speed (i.e., the minimum speed needed for the aircraft 100 to climb to 35 feet with OEI), and $V_{LOF}$, the lift off speed at which the aircraft first becomes airborne. Although not shown, other V speeds may include $V_{MCG}$, the minimum control speed on the ground after one or more engines become inoperative, $V_{MC}$, the minimum control speed in the air after one or more engines become inoperative, and $V_{MU}$, the minimum unstick speed.

In situation 300, an AEO situation, the aircraft 100 is shown to takeoff, reach VR speed, lift off at $V_{LOF}$, and climb to 35 feet at V2 speed. In situation 302, a OEI situation, one engine fails but the aircraft 100 is still able to successfully takeoff. In situation 304, another OEI situation, one engine fails before reaching V1 speed. The aircraft 100 comes to a complete stop without overrunning the runway. The reaction time of the pilot is shown, it takes one second for the pilot to realize that the engine has given out and another two seconds to apply the brakes of the aircraft 100 to stop the aircraft 100. In situation 306, an AEO situation, the pilot of the aircraft 100 aborts the takeoff at V1 speed and the aircraft comes to rest without overrunning the runway.

Figure 4:
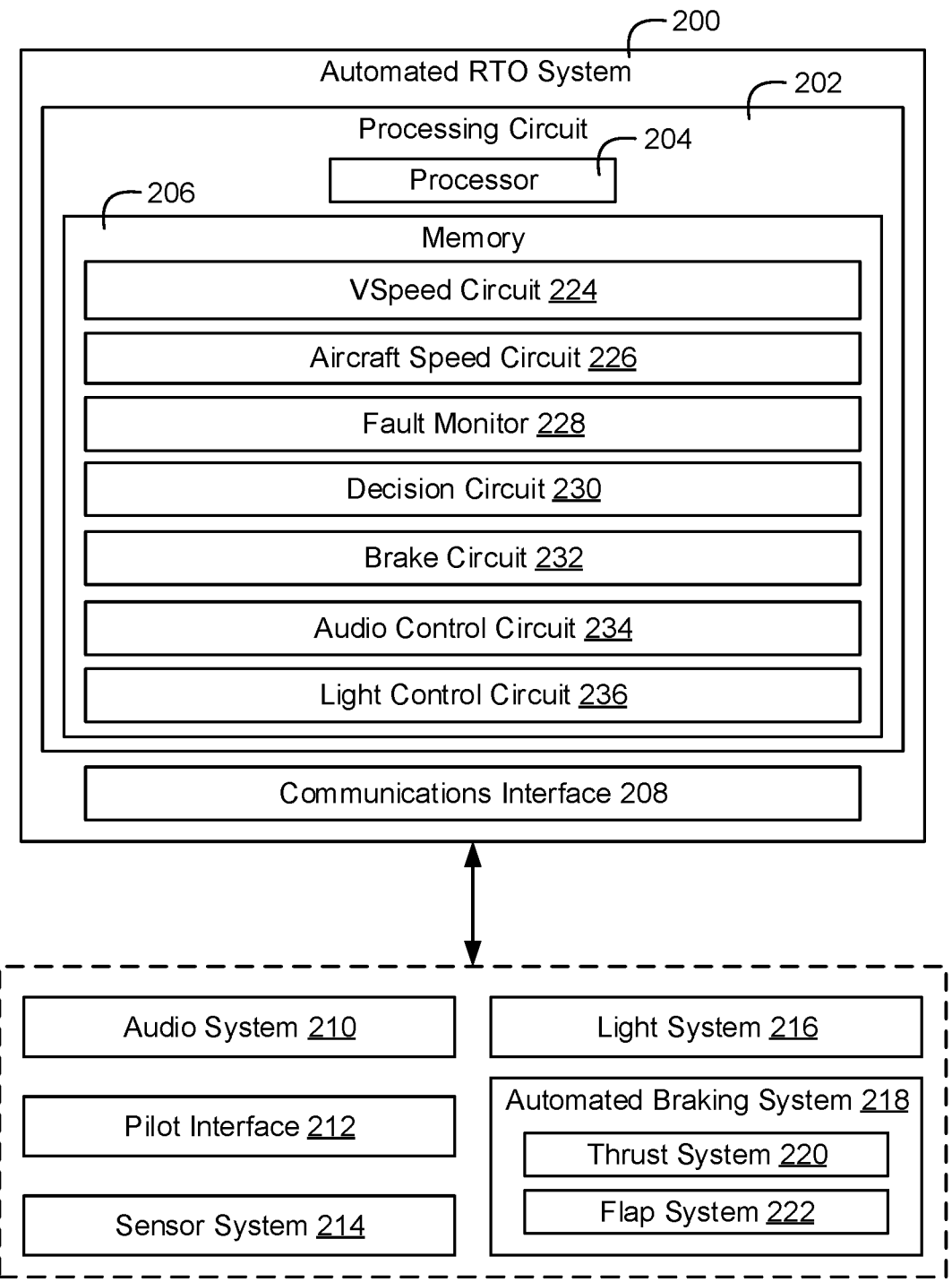
FIG. 4 is a block diagram of the automated RTO system of the aircraft of FIGS. 2-3 shown in greater detail according to exemplary aspects of the inventive concepts disclosed herein.

Referring now to FIG. 4, the automated RTO system 200 of FIGS. 2-3 is shown in greater detail according to an exemplary embodiment. The RTO system 200 may be or may be similar to a flight management system (FMS) of the aircraft 100. In some embodiments, the automated RTO system 200 may be in communication with the FMS of the aircraft 100. The automated RTO system 200 is shown to include a processing circuit 202. The processing circuit 202 is shown to include a processor 204 and memory 206. The processing circuit 202 may include at least one processor 204, which may be any type of general purpose or special purpose processor (e.g., FPGA, CPLD, ASIC). The processing circuit 202 also includes at least one memory 206, which may be any type of non-transitory computer or machine-readable storage medium (e.g., ROM, RAM, hard disk, flash memory).

The automated RTO system 200 is shown to communicate with other avionics systems and peripheral devices via a communications interface 208. The communications interface 208 may be one or more transceivers, receivers, and/or any other hardware communication module that can be configured to communicate directly to various systems and/or via networks (e.g., via LANs or WANs). The communication interface 208 can include one or more ports, e.g., RS-485 connection ports, RS-232 connection ports, Ethernet connection ports, etc. The communications interface 208 can be configured to perform Wi-Fi communication, Zigbee communication, and/or any other wireless communication. Further, the communication's interface 208 can be configured to perform wired communication e.g., RS-485. The communications interface 208 can be configured to facilitate protocols e.g., transport layer protocols (e.g., TCP, UDP, SCTP), Internet layer protocols (e.g., IPv4, IPv6, etc.), etc. The communications interface 208 can be configured to facilitate various ARINC communication protocol e.g., ARIC 429.

The automated RTO system 200 can be configured to communicate with various other avionics systems and peripherals e.g., the audio system 210, the light system 216, the pilot interface 212, the automated braking system 218, the sensor system 214, and/or the thrust system 220. The automated RTO system 200 can be configured to communicate with the other avionics systems and/or peripheral via the communications interface 208.

The audio system 210 may be a system which causes audio messages to be played in a cockpit of the aircraft 100. The audio system may include one or more processing circuits (e.g., the processing circuit 202) and one or more audio speakers. The automated RTO system 200 can be configured to cause the audio system 210 to play a message instruction a pilot of the aircraft 100 to either continue or abort the takeoff. The message could be "Go," "Stop," "Continue takeoff," and/or "Abort takeoff" In some embodiments, the audio system 210 can be configured to play audio in the headphones of the pilots of the aircraft 100.

The light system 216 may be a system that includes one or more lights within the cockpit of the aircraft 100. The lighting system 100 can be configured to illuminate various different colors. In some embodiments, the lighting system 216 can receive an instruction from the automated RTO system 200 which indicates whether a takeoff is being continued or aborted. In response to receiving a message indicating that the takeoff will be continued, the light system 216 can be configured to display a first color. In response to receiving a message indicating that the takeoff is being aborted, the second color. In some embodiments, the light system 216 causes the color associated with continuing takeoff to be illuminated until a message is received indicating that the takeoff will be aborted.

The pilot interface 212 may be one or more buttons, knobs, switches, keypads, and/or any other instrument that can be used to generate an input for the automated RTO system 200. The pilot interface 212 may include a cursor control input (e.g., a mouse, a trackball, or a trackpad), dedicated control inputs (e.g., one or more dedicated control knobs or one or more dedicated buttons), non-dedicated control inputs (e.g., a tabber knob, a selection mechanism, or a button), and/or typed entry fields (e.g., a keyboard).

The pilot interface 212 may be any type of display screen that the overhead display and/or the face-on display can be visually displayed. The pilot interface 212 may be any cathode ray tube (CRT), light-emitting diode display (LED), electroluminescent display (ELD), plasma display panel (PDP), liquid crystal display (LCD), organic light-emitting diode display (OLED), holographic display, and/or any other type of display screen. In some embodiments, the pilot interface 212 is a display screen surrounded by buttons. The touch screen interface may be a resistive touch screen interface, a single-capacitive display screen, and/or a multi-capacitive display screen. The pilot interface 212 may include any type of input and/or output configured to receive input from a pilot and visually display output to the pilot.

The automated RTO system 200 is shown to communicate with a sensor system 214. The sensor system 214 may include one or more processing circuits (e.g., processing circuit 202) and/or a communications interface (e.g., communications interface 208). The sensor system 214 may monitor various functions of the aircraft, e.g., status of tires of the aircraft, status of engines of the aircraft 100, and/or any other component of the aircraft 100 that needs to be monitored via various sensors.

The automated RTO system 200 is shown to communicate with an automated braking system 218. The automated braking system 218 can be configured to cause the aircraft 100 to stop. Specifically, the automated braking system 218 may be able to apply one or more brakes (e.g., speed brakes, aircraft disc brakes, thrust reversers, air brakes, drogue parachutes) when the aircraft 100 is taking off, causing the aircraft to slow down and/or stop. The automated braking system 218 can include and/or be configured to communicate with a thrust system 220 and a flap system 222. During a takeoff, in response to determining to stop the aircraft via a message received from the automated RTO system 200, the automated braking system 218 can cause the thrusters of the aircraft 100 to be reversed via controlling the thrust system 220. Further the automated braking system 218 can cause flaps of the aircraft 100 to be put in a braking position via the flap system 222.

The automated RTO system 200 can be enabled, via pilot interface 212. The pilot may indicate, via the pilot interface 212 that the automated RTO system 200 should be activated and can indicate whether or not the automated RTO system 200 should performed automatic stopping of the aircraft 100 vi the automatic braking system 218. The memory 206 is shown to include a VSpeed circuit 224. The VSpeed circuit 224 can be configured to determine various "V" speeds of the aircraft 100. In some embodiments, the VSpeed circuit 224 can be configured to determine a V1 speed, a VR speed, a V2 speed, and/or a required runway length. The VSpeed circuit 224 can be configured to determine the V speeds based on aircraft weight, flap settings, runway length, runway slop, runway conditions (e.g., ice or water on the runway), weather conditions (e.g., pressure altitude, temperature, etc.). In some embodiments, the VSpeed circuit 224 receives V speeds from a flight management system (FMS).

The memory 206 is shown to include an aircraft speed circuit 226. The aircraft speed circuit 226 can be configured to monitor the speed of the aircraft 100. In some embodiments, the speed circuit receives a speed of the aircraft 100 from an FMS or other system of the aircraft 100 that monitors aircraft speed. The memory 206 is shown to include a fault monitor 228. The fault monitor 228 can be configured to receive information from the FMS or another system of the aircraft 100 that indicates whether the aircraft 100 has encountered any kind of fault or failure event. The fault or failure event may indicate an engine failing, a flap getting stuck, a tire of the aircraft becoming damaged, etc.

The memory 206 is shown to include a decision circuit 230. The decision circuit 230 can be configured to determine whether to abort or continue a takeoff based on an aircraft speed determined by the aircraft speed circuit 226, the V speeds determined by VSpeed circuit 224, and faults determined by the fault monitor 228.

In response to the fault monitor 228 determining that a failure has occurred, the decision circuit 230 can be configured to determine whether to takeoff or abort takeoff. The decision circuit 230 can determine whether the aircraft has reached the VR speed based on the VR speed determined by the VSpeed circuit 224 and the speed of the aircraft determined by the aircraft speed circuit 226. In response to determining that the aircraft has reached the VR speed, the decision circuit 230 can determine to continue the takeoff of the aircraft 100.

In response to determining that the aircraft has not yet reached the VR speed and that a failure event has occurred, the decision circuit 230 can determine whether to continue to takeoff or to abort take off. The decision circuit 230 can determine whether the aircraft 100 has reached V1 speed. If the aircraft 100 has not reached V1 speed, the decision circuit 230 can determine to abort the takeoff. However, if the aircraft 100 has reached and/or passed the V1 speed, but has not yet passed the VR speed, the aircraft 100 can determine whether or not to continue takeoff by determining the remaining runway length and considering the severity of the fault event. If the decision circuit 230 determines that the fault event would prevent the aircraft 100 from flying, the decision circuit 230 can determine to abort the takeoff even though V1 speed is passed. However, if the aircraft 100 would be able to fly, the decision circuit 230 can be configured to determine to continue the takeoff.

Brake circuit 232 is shown to be included in the memory 206. The brake circuit 232 can be configured to cause the automated braking system 218 of the aircraft 100 to stop the aircraft 100. Specifically, the brake circuit 232 can be configured to cause the automated braking system 218 to stop the aircraft in response to the decision circuit 230 determining to abort the takeoff.

Memory 206 is shown to include an audio control circuit 234 and a light control circuit 236. The audio control circuit 234 can be configured to control the audio system 210 while the light control circuit 236 can be configure dot control the light system 216. The audio control circuit 234 can be configured to cause the audio system 210 to enunciate a takeoff message. The takeoff message may be a message indicating to the pilot to abort the takeoff or continue the takeoff. The audio control circuit 234 can cause the audio system 210 to play an abort message in response to the decision circuit 230 determining to abort a takeoff. The audio control circuit 234 can be configured to cause the audio system 210 to play a continue takeoff message in response to the decision circuit 230 determining to continue a takeoff after a fault event has occurred. Similarly, the light control circuit 236 can be configured to cause the light system 216 to illuminate in a first color (e.g., red) if a fault event has occurred and the decision circuit 230 has determined to abort the takeoff and a second color (e.g., green) if no fault event has occurred or if a fault event has occurred and the decision circuit 230 determines to continue the takeoff.

Figure 5A:
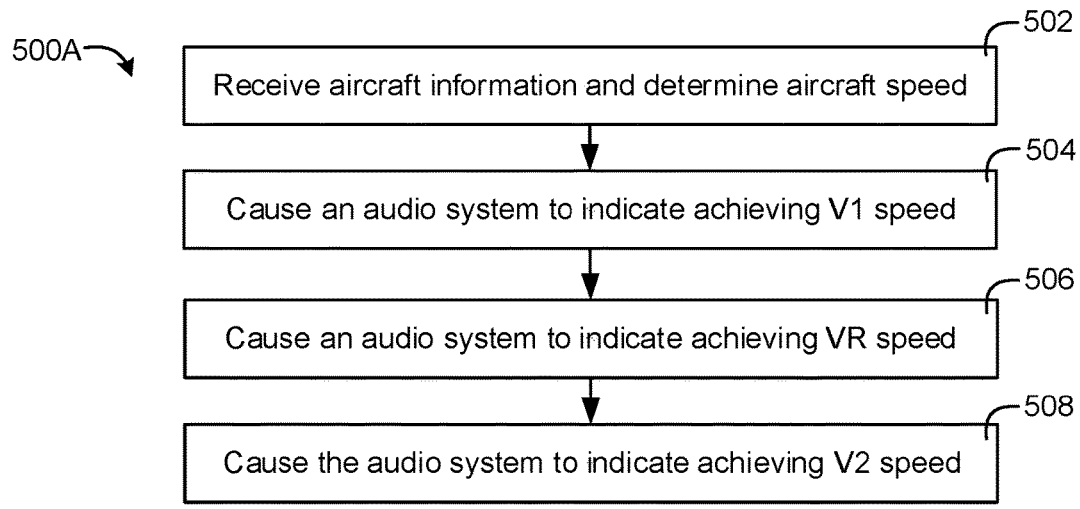
FIG. 5A is a flow chart of a process for notifying a pilot of the speeds of the aircraft of FIG. 1 that can be performed by the automated RTO system, according to the inventive concepts disclosed herein.

Referring now to FIG. 5A, a process 500A is shown for controlling the audio system 210 and the light system 216 of the aircraft 100 according to an exemplary embodiment of the inventive concepts. The automated RTO system 200, and specifically, the components of the memory 206 can be configured to perform process 500A. Any computing device described herein can be configured to perform process 500A.

In step 502, the Vspeed circuit 224 can be configured to receive information from a pilot (e.g., the pilot interface 212) and/or from an avionics system (e.g., FMS) that can be used to determine various V speeds (e.g., V1 speed, VR speed, and/or V2 speed). The information may include runway length, aircraft weight, flap settings, weather conditions, runway conditions, runway slope, etc. In some embodiments, the Vspeed circuit 224 may receive the V speeds directly from the FMS and/or the pilot interface 212 so that no determination of the V speeds is required. Further, the aircraft speed circuit 226 can be configured to receive a speed of the aircraft 100 e.g., receive the speed from an FMS. The aircraft speed circuit 226 can be configured to monitor the speed of the aircraft and compare the speed of the aircraft to various V speeds, i.e., V1 speed, V2 speed, and VR speed.

In step 504, the aircraft speed circuit 226 can compare the aircraft 100 speed to the V speeds and determine that the aircraft has passed V1 speed. In response to this determination, the aircraft speed circuit 226 can cause the audio system 210 to play a message indicating that V1 speed was reached. The message may be "V1 Speed," "V1 Speed Reached," and/or any other message indicating reaching V1 speed.

In step 506, the aircraft speed circuit 226 can compare the aircraft 100 speed to the V speeds and determine that the aircraft has passed VR speed. In response to this determination, the aircraft speed circuit can cause the audio system 210 to play a message indicating that VR speed was reached. The message may be "VR Speed," "VR Speed Reached," and/or any other message indicating reaching VR speed. In step 508, the aircraft speed circuit 226 can compare the aircraft 100 speed to the V speeds and determine that the aircraft has passed V2 speed. In response to this determination, the aircraft speed circuit can cause the audio system 210 to play a message indicating that V1 speed was reached. The message may be "V1 Speed," "V1 Speed Reached," and/or any other message indicating reaching V1 speed.

Figure 5B:
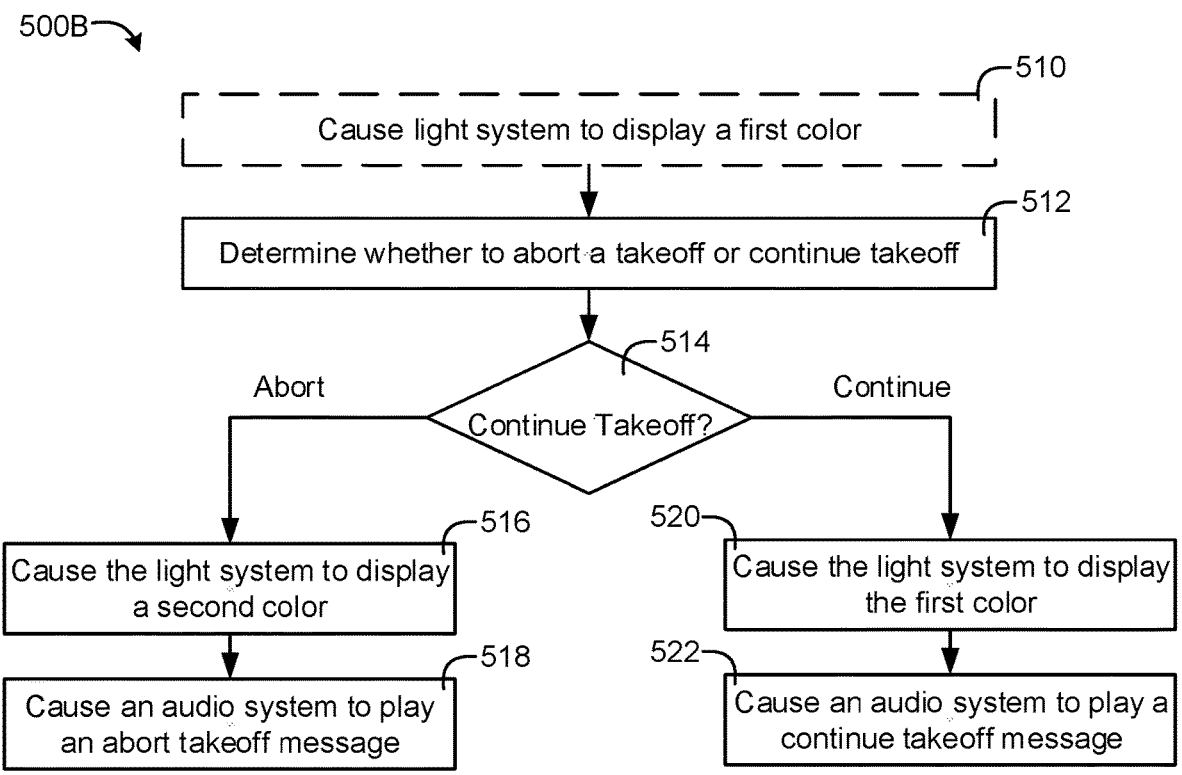
FIG. 5B is a flow chart of a process for notifying a pilot whether to abort or continue a takeoff that can be performed by the automated RTO system, according to the inventive concepts disclosed herein.

Referring now to FIG. 5B, a process 500B is shown for causing the audio system 210 and the light system 216 to indicate to the pilot of the aircraft whether a takeoff is being aborted or continued in response to a failure event occurring according to an embodiment of the inventive concepts. Process 500A and process 500B can be performed by the automated RTO system 200 simultaneously. The automated RTO system 200, and specifically, the components of the memory 206, can be configured to perform process 500B. Any computing device described herein can be configured to perform process 500B.

In step 510, while a takeoff is being started, the light control circuit 236 can be configured to cause the light system 216 to display a first color e.g., green. This may cause green to be displayed constantly until a decision is made to abort the takeoff (e.g., step 514) and a second color is displayed instead of the first color (e.g., step 516).

In step 512, the decision circuit 230 can be configured to determine whether to continue or abort a takeoff in response to a failure event occurring. Determining whether to abort or continue a takeoff is described with further reference to FIG. 4 and FIGS. 6A-6B. In step 514, based on the decision determination of step 512, the process 500B can continue to step 520 or step 516. If the decision is to abort the takeoff, the process 500B continues to the step 516. If the determination of step 512 is to continue the takeoff, the process 500B continues to step 520.

In step 516, the light control circuit 236 can be configured to cause the light system 216 to illuminate in a second color (e.g., red) indicating that the pilot should abort the takeoff. In step 518, the audio control circuit 234 can cause the audio system 210 to cause the audio system 210 to play a message indicating that the pilot should abort the takeoff e.g., "Abort takeoff," "Apply brakes, reverse thrusters, raise flaps," "Abort takeoff, abort takeoff, abort takeoff . . . ," etc.

In step 520, if the light system 216 is not currently illuminated in the first color (e.g., green), the light control circuit 236 can be configured to cause the light system 216 to display the first color. In step 522, the audio control circuit 234 can be configured to cause the audio system 210 to play a message indicating that the pilot should continue takeoff. The message may be "Continue takeoff," "Continue," and/or any other message that indicates to the pilot of the aircraft 100 that the takeoff should be continued.

Figure 6A:
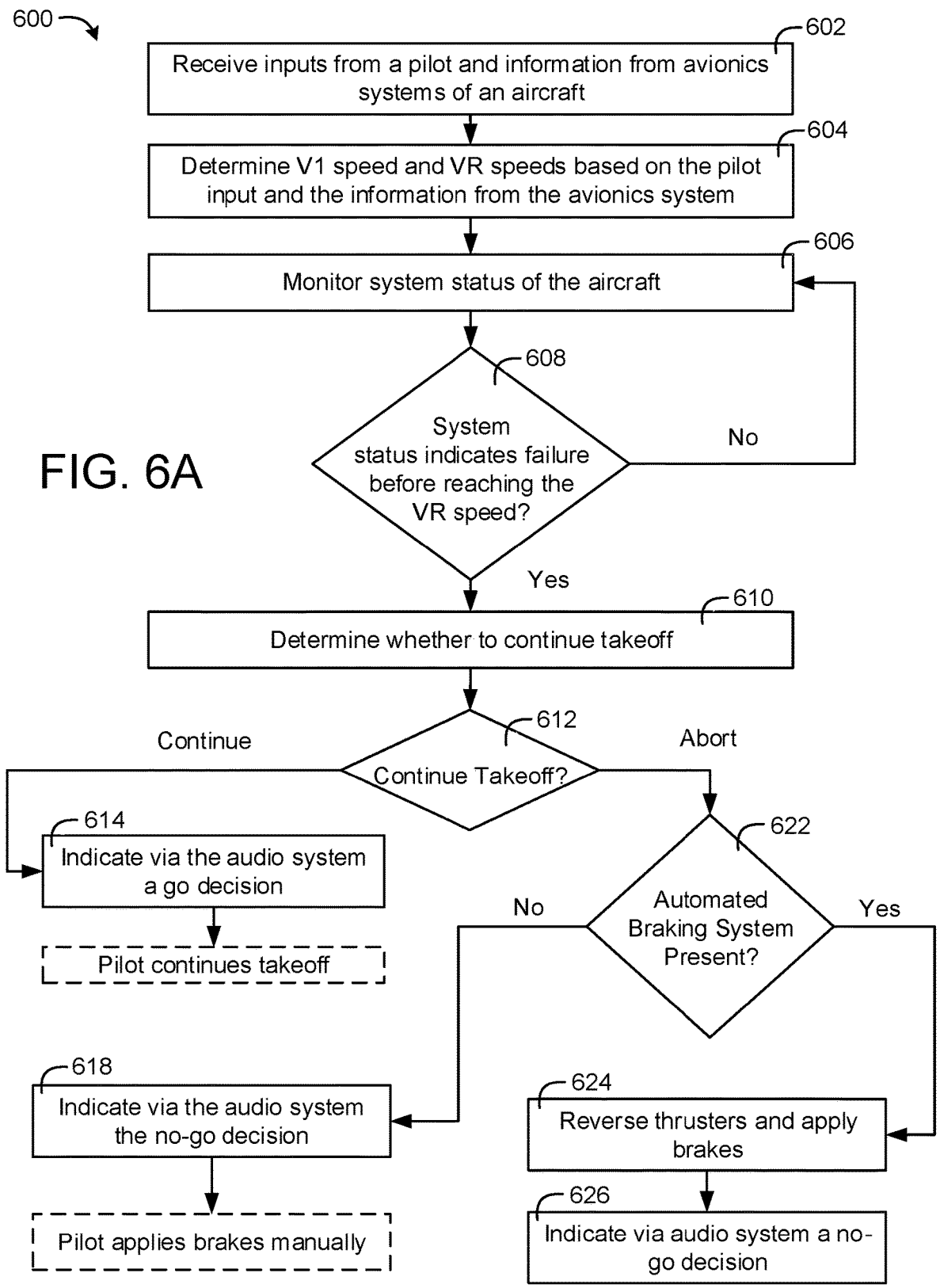
FIG. 6A is a flow chart of a process for determining whether to take-off or abort a take-off when a failure occurs before reaching VR speed that can be performed by the automated RTO system, according to the inventive concepts disclosed herein.

Referring now to FIG. 6A, a process 600A is shown for determining whether to abort or continue a takeoff. The automated RTO system 200 can be configured to perform the process 600A. Specifically, the components of the memory 206 of the automated RTO system 200 and the various systems a peripherals that the automated RTO system 200 communicates with (e.g., the audio system 210, the pilot interface 212, the sensor system 214, the light system 216, and/or the automated braking system 218). Further, any computing device or system described herein can be configured to perform process 600A.

In step 602, the VSpeed circuit 224 can be configured to receive inputs from a pilot, e.g., input from the pilot interface 212 and/or from any avionics system (e.g., a system indicating weather information, a flight management system (FMS), etc.). The input may be weather conditions, runway length, flap settings, runway slope, weather conditions, runway conditions (e.g., snow on runway, rain on runway), and/or any other information that can be used in calculating V speeds. In step 604, the VSpeed circuit 224 can be configured to determine the V1 speed and the VR speed based on the inputs. In some embodiments, the VSpeed circuit 224 does not determine the speeds but rather receives the speeds directly from the pilot interface 212 and/or from an avionics system.

In step 606, the fault monitor 228 can be configured to monitor the status of the aircraft 100 and determine whether a fault event has occurred. For example, the fault monitor 228 can communicate with various sensor systems (e.g., the sensor system 214). The faults may be a tire blowing out, one engine failing, two engines failing, etc. Further, the aircraft speed circuit 226 can be configured to monitor the speed of the aircraft 100. The aircraft speed circuit 226 can be configured to receive an aircraft speed form a FMS of the aircraft 100.

In step 608, the decision circuit 230 can be configured to determine whether a failure event has occurred before the aircraft 100 has reached the VR speed. The decision circuit 230 can perform this determination by comparing the aircraft speed to the VR speed. If the aircraft 100 has not experienced a fault event before reaching VR speed, the process may continue to step 606. In response to determining that the aircraft 100 has experienced a fault before reaching the VR speed, the process 600A may proceed to step 610.

In step 610, the decision circuit 230 can determine whether to continue the takeoff or abort the takeoff. The decision circuit 230 can determine whether to continue to or abort the takeoff based on the speed of the aircraft, flap settings of the aircraft, the fault that has occurred, and remaining length of runway. In some embodiments, the decision circuit 230 determines whether the fault event has occurred before reaching V1 speed. In response to determining that the aircraft 100 experienced the fault before reaching the V1 speed, the decision circuit 230 can determine to abort the takeoff.

If the aircraft 100 has passed the V1 speed but has not yet reached the VR speed, the decision circuit 230 can determine whether the fault may prevent the aircraft 100 from taking off. For example, if two engines of the aircraft 100 have failed and there is not enough runway length left to takeoff, the decision circuit 230 can be configured to determine to abort the takeoff. However, if the aircraft 100 has passed the V1 speed but has not yet reached the VR speed, the decision circuit 230 can be configured to determine whether the failure event prevents taking off. For example, if a single engine has given out, the decision circuit 230 may determine to continue the takeoff.

The decision circuit 230 can be configured to group failure events into two categories, critical and non-critical. A non-critical event occurring after V1 speed may not be damaging enough to the aircraft 100 to prevent the aircraft 100 from flying (e.g., a single engine failure). However, failure events that occur after V1 speed that prevent the aircraft 100 from flying (e.g., two engine failures, all engines out, etc.). In response to a critical failure event occurring, even though V1 speed may have been reached, the decision circuit 230 can be configured to decide to abort the takeoff.

In step 612, the processing circuit 202 can determine to continue to step 614 or step 622 based on the determination of step 610 by the decision circuit 230. If the decision is to abort the takeoff, the process 600A may continue to step 614. If the decision is to continue the takeoff, the process 600A can continue to the step 622.

In step 614, the audio control circuit 234 can be configured to play a message to the pilot to continue the takeoff. This may be the same and/or similar to step 522 of process 500B. Further the light control circuit 236 can cause the light control circuit 236 to display a first color (e.g., green). This may be the same and/or similar to step 516 of the process 500B. The message may indicate that the pilot should continue the takeoff of the aircraft 100. The pilot may takeoff and then circle the aircraft 100 back to the runway for a landing.

In step 622, brake circuit 232 can determine whether the aircraft 100 includes an automated braking system 218 capable of stopping the aircraft without input from the pilot of the aircraft 100. If the aircraft 100 includes an automated braking system, the process 600A may continue to step 624. If the aircraft 100 does not include the automated braking system, the process 600A can continue to the step 618.

In step 618, the audio control circuit 234 can cause the audio system 210 to play an audio message indicating that the pilot should abort the takeoff. This may be the same or similar to the step 518. Further, the light control circuit 236 can cause the light system 216 to display a second color e.g., red, indicating that the pilot should abort the takeoff. This may be the same and/or similar to step 518 of the process 500B. This may indicate to the pilot that the pilot should manually apply the brakes, reverse the thrusters, extend the flaps, and/or raise the spoilers.

In step 624, the brake circuit 232 can cause the automated braking system 218 to reverse thrusters, apply brakes to the runway wheels of the aircraft, extend flaps of the aircraft, and/or raise spoilers of the aircraft 100 causing the aircraft 100 to stop. In step 626, the audio control circuit 234 can cause the audio system 210 to play an audio message indicating that the pilot should abort the takeoff. This may be the same or similar to the step 518. Further, the light control circuit 236 can cause the light system 216 to display a second color e.g., red, indicating that the pilot should abort the takeoff. This may be the same and/or similar to step 518 of the process 500B.

Figure 6B:
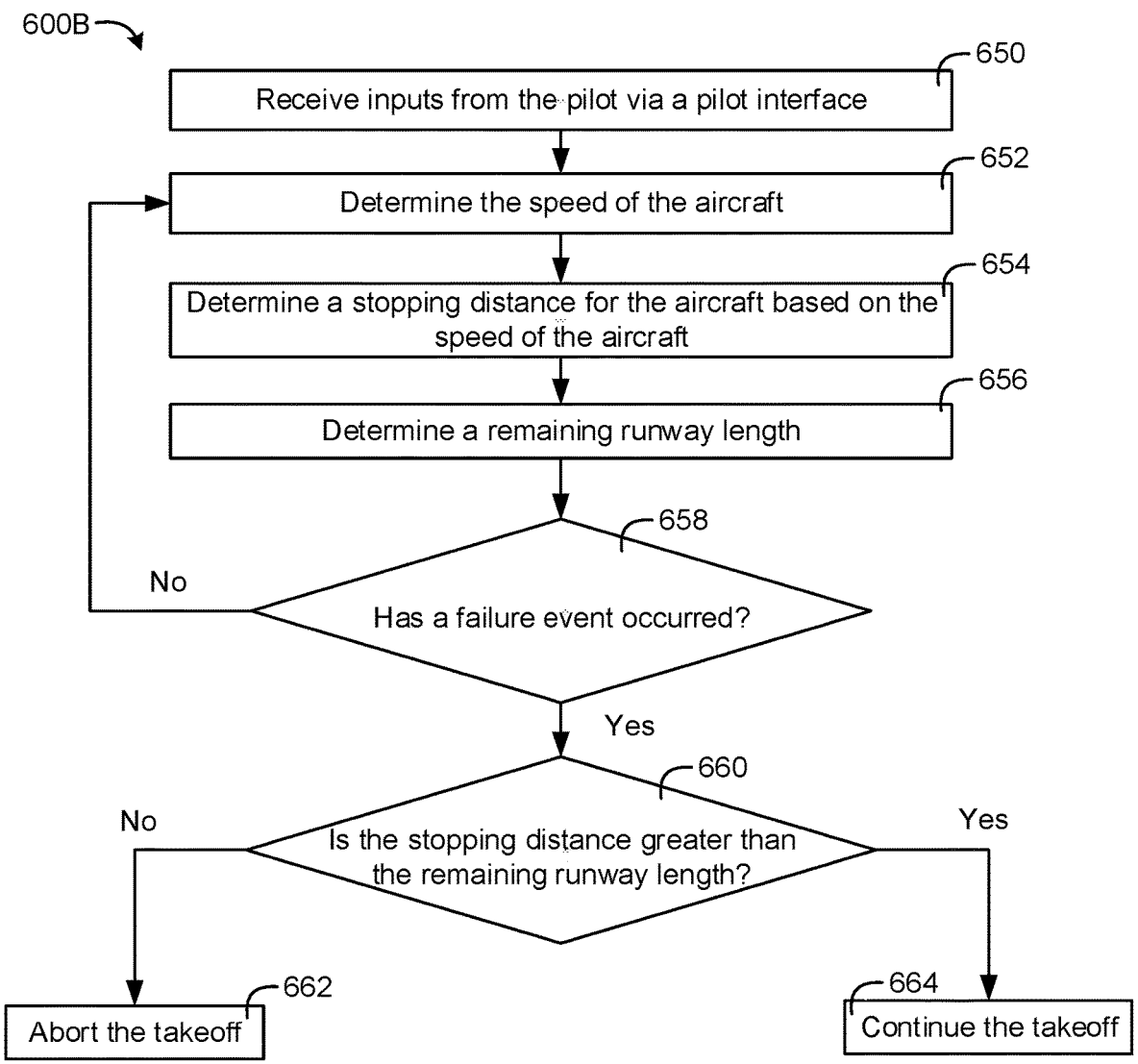
FIG. 6B is a flow chart of a process for determining whether to take-off or abort a take-off based on a stopping distance of the aircraft, according to the inventive concepts disclosed herein.

Referring now to FIG. 6B, process 600B is shown for determining whether to takeoff or abort a takeoff based on a stopping distance determined for the aircraft 100, according to an exemplary embodiment. The automated RTO system 200 can be configured to perform the process 600B. Specifically, the components of the memory 206 of the automated RTO system 200 and the various systems and peripherals that the automated RTO system 200 communicates with (e.g., the audio system 210, the pilot interface 212, the sensor system 214, the light system 216, and/or the automated braking system 218) can be configured to perform the process 600B. Further, any computing device or system described herein can be configured to perform the process 600B. Process 600B illustrates various functions of process 600A in greater detail, for this reason, the automated RTO system 200 can perform both process 600A and process 600B together.

In step 650 of the process 600B, the automated RTO system 200 can be configured to receive various inputs from a pilot of the aircraft 100 via the pilot interface 212. The inputs may be a runway length, a weight of the aircraft, weather conditions, conditions of a runway, and/or any other information. Step 650 may be the same and/or similar to step 602 of the process 600A as described with reference to FIG. 6A. This input information can be used by the automated RTO system 200 to determine various V speeds for the aircraft 100, an actual speed of the aircraft 100, and/or an acceleration of the aircraft 100.

In step 652, the aircraft speed circuit 226 can be configured to determine an acceleration of the aircraft 100, a speed of the aircraft 100, and/or a velocity of the aircraft 100. In some embodiments, aircraft speed circuit 226 uses a determined acceleration to determine the velocity or speed of the aircraft 100. In some embodiments, a FMS determines the acceleration, speed, and/or velocity of the aircraft 100 and communicates the information to the aircraft speed circuit 226. In some embodiments, step 652 (or all of steps 652-660) is performed for one second into the future i.e., it is a prediction. A pilot may take approximately one second to react to a fault or to a command to abort or continue a takeoff. For this reason, if the prediction is made one second into the future, the time it takes the pilot to react can be compensated for.

In step 654, the aircraft speed circuit 226 can determine a stopping distance of the aircraft 100. The aircraft speed circuit 226 can be configured to determine the stopping distance based on either the acceleration of the aircraft 100 and/or the speed of the aircraft 100. The aircraft speed circuit 226 can determine, based on the speed of the aircraft 100, the distance required to bring the aircraft 100 to a complete stop. This may be determined further based on the weight of the aircraft 100, weather conditions, conditions of the runway, etc. The aircraft speed circuit 226 can be configured to determine the stopping distance of the aircraft 100 based on a takeoff performance chart which may be a relationship between the distance required to stop, the weight of the aircraft, and/or the speed of the aircraft, for example, chart 700 as described with reference to FIG. 7. In some embodiments, the aircraft speed circuit 226 can be configured to determine the stopping distance based on Equations 1-6 described below for a slopped runway or equations 7-8 described below for a flat runway.

In step 656, the aircraft speed circuit 226 can determine a remaining runway length. In some embodiments, the aircraft speed circuit 226 can receive a total runway length (e.g., step 650) and determine the distance traveled by the aircraft 100 as the aircraft 100 takes off. Based on the distanced traveled by the aircraft 100 and based on the total runway length, the aircraft speed circuit 226 can be configured to determine the remaining runway length.

In step 658, the fault monitor circuit 228 can be configured to determine whether a fault event has occurred (e.g., engine failure, tire failure, improper configuration of the aircraft, and indicator or light failure, etc.). The fault events may include the fault events in chart 100 of FIG. 1A. If a fault event has occurred, the process 600B may continue to step 660. If a fault event has not occurred, the process 600B may continue to step 652. Step 658 may be the same and/or similar to step 606 of process 600A.

In step 660, the decision circuit 230 can determine, based on the remaining runway length determined in step 656 and the stopping distance of the aircraft 100 determined in step 654, whether the stopping distance is greater than the available runway length. If the stopping distance is greater than the available runway length, the decision circuit 230 can determine to continue the takeoff and proceed to step 664. If the stopping distance is less than (or in some embodiments, equal to) the available runway length, the decision circuit 230 can determine to abort the takeoff and proceed to step 662. In some embodiments, the comparison between the stopping distance and the remaining runway distance is a comparison between the stopping distance and the remaining runway length minus a predefined amount. The predefined amount may ensure that the aircraft 100 comes to a stop on the runway with the predefined amount of runway length to spare. Step 660 may ensure that if a failure event has occurred and the aircraft 100 can be stopped before leaving the end of the runway, the decision circuit 230 determines to stop the aircraft.

In some embodiments, the decision circuit 230 determines an accelerate stop distance. This accelerate stop distance may be the total distance for the aircraft to accelerate, encounter a failure (e.g., lose an engine at a particular speed) and come to a complete stop. The decision circuit 230 can be configured to compare the accelerate stop distance to a total runway length (or a particular amount of the runway length, an available runway length). If the available runway length is greater than the accelerate stop distance, the decision circuit 230 can determine to abort the takeoff since the aircraft 100 can come to a stop on the runway. If the available runway length is less than the accelerate stop distance, the decision circuit 230 can determine to continue the takeoff.

In some embodiments, the decision circuit 230 may only perform step 660 is the aircraft has not yet reached VR speed. If the aircraft 100 has reached VR speed, the aircraft 100 may be committed to taking off. However, if the aircraft 100 has not yet reached the VR speed, the decision circuit 230 can perform the step 660.

In some embodiments, there is a one second delay between steps 658 and step 660. This one second delay may cause the determination by the automated RTO system 200 to abort or continue the takeoff to occur at the same time that the pilot determines whether the takeoff should be continued or abort i.e., it may take one second for the pilot to realize that the fault has occurred and make a decision to abort or continue the takeoff. In this manner, the pilot may receive direction from the automated RTO system 200 as he determines whether to continue or abort the takeoff.

Step 662 may be the same and/or similar to steps 622-626 and 618. If an automated braking system is available (e.g., the automated braking system 218), the brake circuit 232 can be configured to cause the aircraft 100 to come to a stop. Regardless if the automated braking system 218 is present, the audio control circuit 234 can cause the audio system 210 to play a message indicating that the pilot should abort the takeoff e.g., step 618. Based on either the pilot causing the aircraft 100 to come to brake or the automated braking system 218, the aircraft 100 may safely come to a complete stop within an available runway length.

Step 664 may be the same and/or similar to step 614. In step 664 the audio control circuit 234 may cause the audio system 210 to play a "Go" message indicating that the pilot should continue the takeoff. The pilot may then continue the takeoff with full thrust. Once the aircraft 100 is airborne and has climbed to safe altitude, the pilot may perform a go-around and land the aircraft. In some embodiments, once the aircraft 100 reaches the safe altitude, the audio control circuit 234 causes the audio system 210 to play a message indicating that the pilot should perform a go-around and land the aircraft. Once the runway is clear, the pilot of the aircraft 100 may commence landing the aircraft 100.

Figure 7:
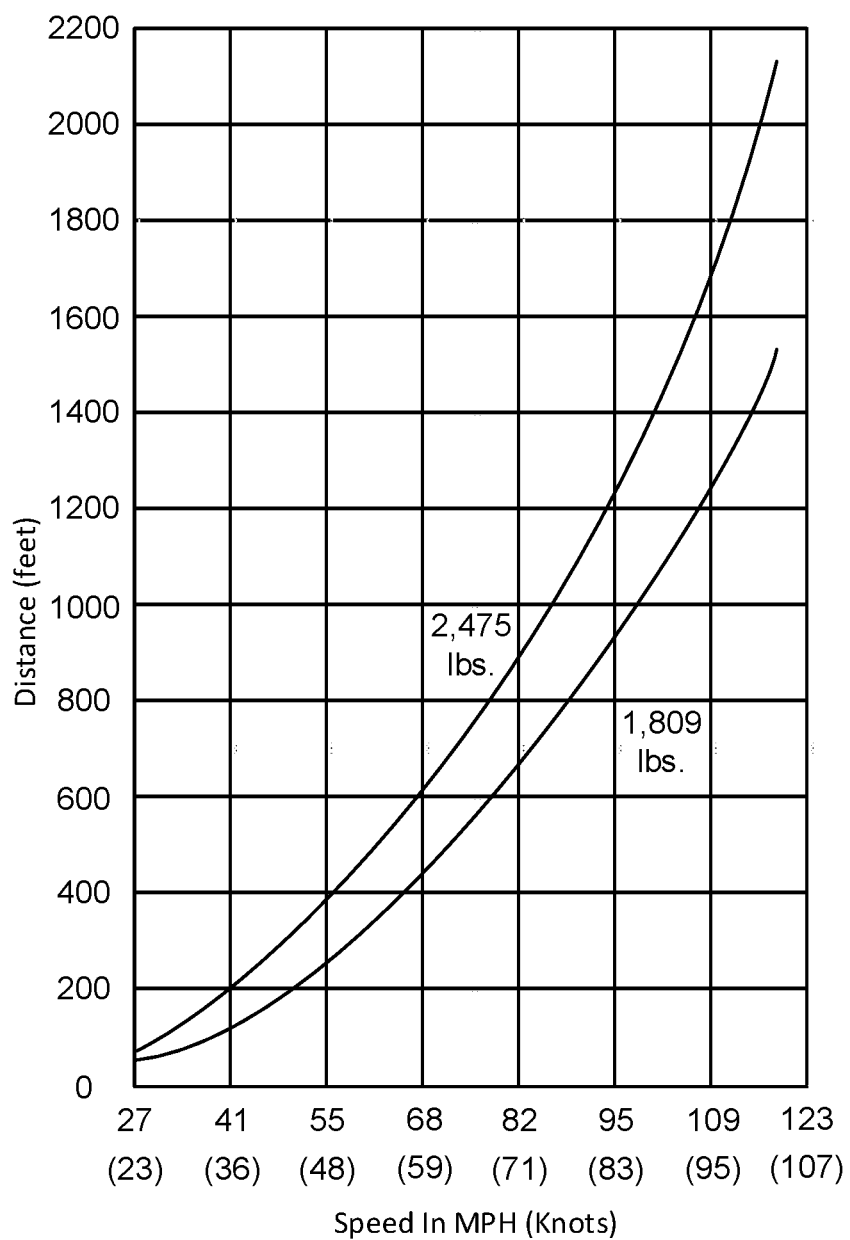
FIG. 7 is a chart of stopping speeds for the aircraft, according to the inventive concepts disclosed herein.

Referring now to FIG. 7, a takeoff performance chart 700 illustrates a stopping distance of the aircraft 100 for two different weights of the aircraft 100 i.e., 2,475 lbs. and 1,809 lbs. The decision circuit 230 can be configured to store the relationship illustrated in chart 700 and/or any other similar relationship for determining a stopping distance based on the speed of the aircraft 100. The decision circuit 230 can be configured to use the stopping distance relationship to determine whether to abort a takeoff or continue a takeoff.

The decision circuit 230, or any other component of the automated RTO system 200, can be configured to determine the stopping distance (e.g., the braking distance) based on the following equations 5-6 for a slopped runway.

$$d = V * \left(\frac{V}{2g(f+G)}\right) \quad \text{(Equation 1)}$$

$$d = \text{Braking Distance (feet)} \quad \text{(Equation 2)}$$

$$g = \text{Acceleration Due To Gravity}\left(32.2\frac{\text{feet}}{\text{sec}^2}\right) \quad \text{(Equation 3)}$$

$$G = \text{Runway Grade As A Percentage, e.g., 2\% (0.02)} \quad \text{(Equation 4)}$$

$$V = \text{Initial Vehicle Speed (feet/sec)} \quad \text{(Equation 5)}$$

$$f = \text{Coefficient Of Friction} \quad \text{(Equation 6)}$$
$$\text{Between The Tires And The Runway}$$

Alternatively, the decision circuit 230, or any other component of the automated RTO system 200, can be configured to determine a stopping distance for a flat runway via Equations 7 and 8.

$$d = V * \left(\frac{V}{2a}\right) \quad \text{(Equation 7)}$$

$$a = \text{The Negative Acclerate Caused By Braking} \quad \text{(Equation 8)}$$

The decision circuit 230 can be configured to determine an all engine go distances, an engine out accelerate go distances, and an accelerate stop distances. The all engine go distance may be the total distance of the aircraft to takeoff from rest, assuming no failures occur. The engine out accelerate go distance may be the total distance for the aircraft 100 to takeoff from rest, assuming one engine has failed during the takeoff. The accelerate stop distance may be the distance of the aircraft to start from rest, encounter a failure, and abort the takeoff at V1 speed, and come to a complete stop. The decision circuit 230 can be configured to determine and/or compare these values with an aircraft stop distance at a particular interval (e.g., 10 Hz, 10 kHz, 10 MHz, etc.). Based on the comparison, and in some embodiments, the remaining runway length, the decision circuit 230 can be configured to determine whether to takeoff or abort a takeoff (e.g., send commands to flight control or Thrust Arbitrary Function (TAF) to stop the aircraft. In one example, the decision circuit 230 can determine, in the event that a failure occurs, a stopping distance and determine, based on a remaining runway length, if the aircraft 100 can be stopped to prevent the aircraft 100 from running off the end of the runway.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. An automated take-off system for an aircraft, the system comprising:
   an automated braking system of the aircraft, the braking system configured to cause the aircraft to stop;
   a pilot interface;
   a sensor system configured to detect a one engine inoperative event and a tire failure event; and
   a processing circuit configured to determine whether to abort the takeoff or continue the takeoff based on the speed of the aircraft and a remaining runway length, comprising:
      a fault monitor configured to:
         receive information from the sensor system and a flight management system; and
         determine whether a fault event has occurred from a set of fault events wherein the set of fault events includes the one engine failure event, the tire failure event, and an improper configuration event; and
      a VSpeed circuit configured to determine a VR speed and a V1 speed based on a set of conditions comprising runway length, an aircraft weight, weather conditions, runway conditions, flap settings, and thrust settings, the processing circuit further configured to:
         receive input from the pilot interface and input from one or more avionics systems of the aircraft;
         determine a stopping distance of the aircraft based on at least the speed of the aircraft;
         determine the remaining runway length;
         compare the stopping distance to the remaining runway length;
         determine whether a speed of the aircraft is less than a VR speed;
         determine to abort the takeoff in response to determining, based on a comparison, that the speed of the aircraft is less than the VR speed and that the fault event has occurred, or determine to abort the takeoff in response to determining, based on the comparison, that the stopping distance is not greater than the remaining runway length;
         determine to continue the takeoff in response to determining, based on the comparison, that the stopping distance is greater than the remaining runway length; and
         cause the automated braking system to stop the aircraft in response to determining to abort the takeoff.

2. The system of claim 1, wherein the processing circuit is configured to:
   determine whether the aircraft comprises the automated braking system; and
   cause the braking system to stop the aircraft in response to determining to abort the takeoff and in response to determining that the aircraft comprises the automated braking system.

3. The system of claim 1, wherein the processing circuit is configured to:
   determine whether the speed of the aircraft is less than a V1 speed; and
   determine to abort the takeoff in response to determining that the speed of the aircraft is less than the V1 speed and that the aircraft failure event has occurred.

4. The system of claim 1, wherein the processing circuit is configured to cause the automated braking system to stop the aircraft by causing thrusters of the aircraft to be reversed and aircraft brakes to be applied.

5. The system of claim 1, wherein the system further comprises an audio system configured to play audible instructions to a pilot, wherein the instructions comprise an audio message indicating that the pilot should abort the takeoff and another audio message indicating that the pilot should continue the takeoff.

6. The system of claim 5, wherein the processing circuit is configured to:
   cause the audio system to play the audio message indicating that the pilot should abort the takeoff in response to abort the takeoff; and
   cause the audio system to play the audio message indicating that the pilot should continue the take the takeoff in response to continue the takeoff.

7. The system of claim 1, wherein the system further comprises a lighting system configured to illuminate a first color or a second color indicating to the pilot whether to continue takeoff or abort takeoff; and
   wherein the processing circuit is configured to:
      cause the lighting system to illuminate the first color in response to determining to abort the takeoff;
      cause the lighting system to illuminate the second color in response to determining to continue the takeoff.

8. The system of claim 1, wherein the sensor system further detects, a faulty indicator and a bird strike; wherein a set of fault events further includes the faulty indicator, and the bird strike.

9. The system of claim 1, wherein the automatic braking system and the processing circuit are communicatively coupled to an autopilot system, wherein causing the automated braking system to stop the aircraft comprises an engagement between the processing circuit and an autopilot system, wherein the autopilot system activates the automatic braking system.

* * * * *